(12) United States Patent
Konolige et al.

(10) Patent No.: US 9,707,682 B1
(45) Date of Patent: Jul. 18, 2017

(54) METHODS AND SYSTEMS FOR RECOGNIZING MACHINE-READABLE INFORMATION ON THREE-DIMENSIONAL OBJECTS

(71) Applicant: Google Inc., Mountain View, CA (US)

(72) Inventors: Kurt Konolige, Menlo Park, CA (US); Ethan Rublee, Mountain View, CA (US); Gary Bradski, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/950,828

(22) Filed: Nov. 24, 2015

Related U.S. Application Data

(63) Continuation of application No. 14/213,191, filed on Mar. 14, 2014, now Pat. No. 9,227,323.

(Continued)

(51) Int. Cl.
*B25J 9/16* (2006.01)
*B25J 19/00* (2006.01)
(Continued)

(52) U.S. Cl.
CPC ............ *B25J 9/1697* (2013.01); *B25J 19/00* (2013.01); *G06K 9/00201* (2013.01);
(Continued)

(58) Field of Classification Search
CPC ...... G05B 2219/31212; G05B 19/4183; B07C 5/00; B65G 47/90; B65G 47/91;
(Continued)

(56) References Cited

U.S. PATENT DOCUMENTS

| 8,326,037 B1 * | 12/2012 | Abitz | G06K 7/1443 |
| | | | 235/462.01 |
| 2002/0118874 A1 * | 8/2002 | Chung | G06T 7/0083 |
| | | | 382/154 |

(Continued)

OTHER PUBLICATIONS

Steven Moser, Using Bounce Mirrors to Read Codes in Tight Spaces, Jun. 17, 2013.*

*Primary Examiner* — Abby Lin
(74) *Attorney, Agent, or Firm* — McDonnell Boehnen Hulbert & Berghoff LLP

(57) ABSTRACT

Methods and systems for recognizing machine-readable information on three-dimensional (3D) objects are described. A robotic manipulator may move at least one physical object through a designated area in space. As the at least one physical object is being moved through the designated area, one or more optical sensors may determine a location of a machine-readable code on the at least one physical object and, based on the determined location, scan the machine-readable code so as to determine information associated with the at least one physical object encoded in the machine-readable code. Based on the information associated with the at least one physical object, a computing device may then determine a respective location in a physical environment of the robotic manipulator at which to place the at least one physical object. The robotic manipulator may then be directed to place the at least one physical object at the respective location.

19 Claims, 11 Drawing Sheets

Related U.S. Application Data

(60) Provisional application No. 61/793,151, filed on Mar. 15, 2013, provisional application No. 61/798,425, filed on Mar. 15, 2013, provisional application No. 61/798,564, filed on Mar. 15, 2013, provisional application No. 61/798,505, filed on Mar. 15, 2013.

(51) Int. Cl.
  *G06K 9/32* (2006.01)
  *G06K 9/00* (2006.01)
  *G06K 9/62* (2006.01)

(52) U.S. Cl.
  CPC ....... *G06K 9/00664* (2013.01); *G06K 9/3208* (2013.01); *G06K 9/6202* (2013.01); *Y10S 901/06* (2013.01); *Y10S 901/09* (2013.01)

(58) Field of Classification Search
  CPC .... B23P 19/007; B65H 67/065; B25J 9/1697; B25J 9/0093; B25J 9/162; B25J 5/007; B25J 19/00; B25J 19/02; B25J 19/021; B25J 19/023; B25J 19/025; Y10S 901/06; Y10S 901/09; Y10S 901/47; G06K 9/00201; G06K 9/00664; G06K 9/3208; G06K 9/6202

See application file for complete search history.

(56) References Cited

U.S. PATENT DOCUMENTS

| | | | | |
|---|---|---|---|---|
| 2003/0098357 | A1* | 5/2003 | Cummings | G06K 7/14 235/494 |
| 2004/0067127 | A1* | 4/2004 | Hofmeister | B25J 19/02 414/744.5 |
| 2006/0151604 | A1* | 7/2006 | Zhu | G06K 7/14 235/454 |
| 2010/0129789 | A1* | 5/2010 | Self | B01L 9/06 435/5 |
| 2013/0096713 | A1* | 4/2013 | Takizawa | B65G 61/00 700/224 |
| 2014/0132729 | A1* | 5/2014 | Foulk | G01N 21/9515 348/46 |
| 2015/0243473 | A1* | 8/2015 | Price | H01J 37/20 250/442.11 |

* cited by examiner

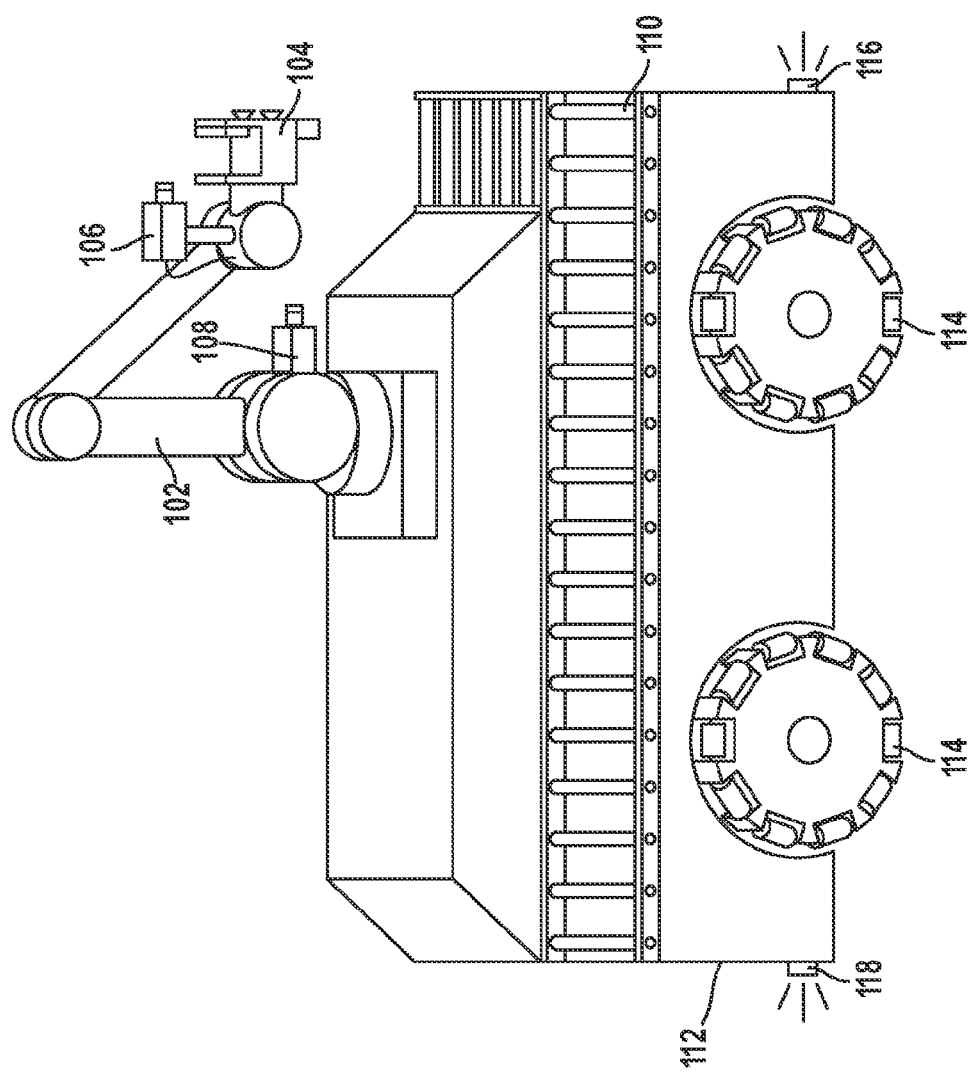

METHODS AND SYSTEMS FOR RECOGNIZING MACHINE-READABLE INFORMATION ON THREE-DIMENSIONAL OBJECTS

CROSS-REFERENCE TO RELATED APPLICATIONS

The present application is a continuation of U.S. patent application Ser. No. 14/213,191, filed on Mar. 14, 2014, and entitled "Methods and Systems for Recognizing Machine-Readable Information On Three-Dimensional Objects," which claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present application discloses embodiments that relate to recognition of machine-readable information on three-dimensional (3D) objects. In one aspect, the present application describes a system. The system may include a robotic manipulator. The system may further include one or more optical sensors. The system may still further include at least one processor. The system may yet still further include data storage comprising instructions executable by the at least one processor to cause the system to perform functions. The functions may include causing the robotic manipulator to move at least one physical object through a designated area in space of a physical environment of the system. The functions may further include causing the one or more optical sensors to (i) determine a location of a machine-readable code on the at least one physical object as the at least one physical object is moved through the designated area in space and (ii) based on the determined location, scan the machine-readable code as the at least one physical object is moved through the designated area in space so as to determine information associated with the at least one physical object encoded in the machine-readable code. The functions may further include, based on the information associated with the at least one physical object, determining a respective location in the physical environment at which to cause the robotic manipulator to place the at least one physical object.

In another aspect, the present application describes another system. The system may include a robotic manipulator. The system may further include one or more optical sensors coupled to the robotic manipulator. The system may still further include at least one processor. The system may yet still further include data storage comprising instructions executable by the at least one processor to cause the system to perform functions. The functions may include determining respective locations in a designated area of a physical environment of the system at which to place the one or more optical sensors such that the one or more sensors are proximate to at least one physical object in the designated area. The functions may further include causing the at least one robotic manipulator to move to a particular location such that the one or more optical sensors are located at the determined respective locations. The functions may further include causing the one or more optical sensors to (i) determine a location of a machine-readable code on the at least one physical object while the at least one physical object is in the designated area and (ii) based on the determined location, scan the machine-readable code while the at least one physical object is in the designated area. The functions may further include, based on information associated with the at least one physical object encoded in the machine-readable code, determining a respective location in the physical environment at which to cause the at least one robotic manipulator to place the at least one physical object.

In still another aspect, the present application describes a method. The method may involve a computing device causing a robotic manipulator to move at least one physical object through a designated area in space. The method may further involve the computing device determining, via one or more optical sensors, a location of machine-readable information included on the at least one physical object as the at least one physical object is moved through the designated area in space, where the machine-readable information is representative of data associated with the at least one physical object. The method may further involve, based on the determined location and further based on a scanning of the machine-readable information by the one or more optical sensors as the at least one physical object is moved through the designated area in space, the computing device receiving the data associated with the at least one physical object. The method may further involve, based on the data, the computing device determining a respective location in a physical environment of the robotic manipulator at which to place the at least one physical object. The method may further involve the computing device causing the robotic manipulator to move the at least one physical object to the respective location.

In yet another aspect, a system is provided that includes a means for causing a robotic manipulator to move at least one physical object through a designated area in space. The system further includes a means for determining a location of machine-readable information included on the at least one physical object as the at least one physical object is moved through the designated area in space, where the machine-readable information is representative of data associated with the at least one physical object. The system further includes a means for, based on the determined location, scanning the machine-readable information as the at least one physical object is moved through the designated area in space so as to determine the data associated with the at least one physical object. The system further includes a means for, based on the data, determining a respective location in a physical environment of the robotic manipulator at which to place the at least one physical object. The system further includes a means for causing the robotic manipulator to move the at least one physical object to the respective location.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1A shows a robotic arm mounted on a moveable cart, according to an example embodiment.

DETAILED DESCRIPTION

Figure 1B:
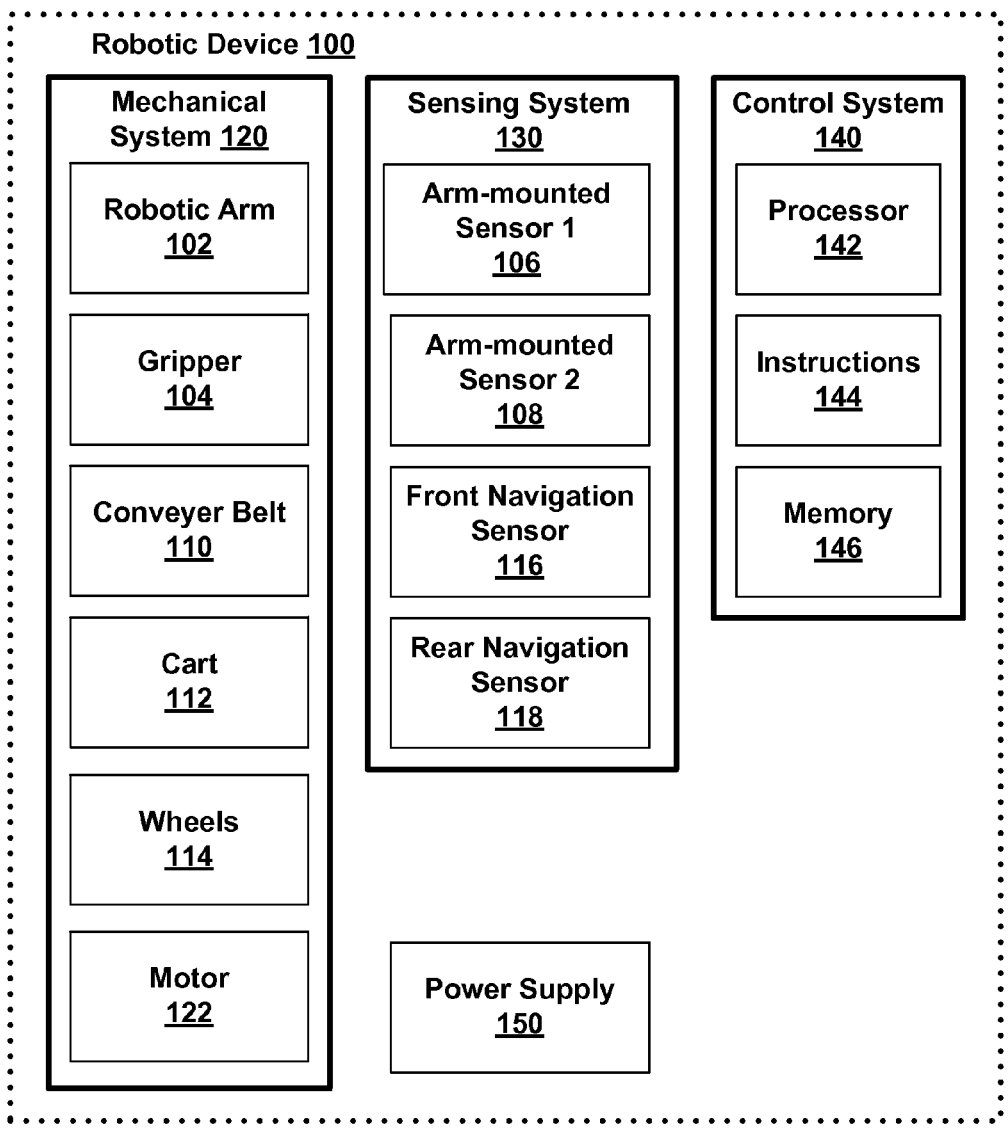
FIG. 1B is a functional block diagram illustrating a robotic device, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In the following description, the terms "sensor," "camera," or "optical sensor" may be used interchangeably and may refer to device or devices (mono or stereo arrangements) configured to perform 3D image sensing, 3D depth sensing, 2D image sensing, 2D depth sensing (i.e., 2D image and corresponding depth map), machine-readable code scanning, and/or other types of sensing of a physical environment of the device.

Further, in the following description, the terms "machine-readable code" and "machine-readable information" may be used interchangeably to refer to barcodes, text strings recognizable by optical character recognition (OCR) methods, or other machine-readable information. Likewise, the terms "barcode," "text," or variations thereof may be used as examples of machine-readable information, and such terms may be interchangeable as well.

In particular, examples of machine-readable information may include one-dimensional (1D) barcodes, 2D barcodes (e.g., QR codes), and/or other types of barcodes. Further, machine-readable code may take the form information encoded in a message or image included on a physical object, and sensors described herein may be configured to decode such messages or images so as to extract the encoded information. Other examples of machine-readable information are possible as well.

Still further, in the following description, the term "robotic manipulator" may be used to describe one or more robotic devices, such as a robotic arm, configured to grab, move, or otherwise manipulate physical objects, such as boxes.

In some scenarios, methods and systems for scanning machine-readable codes or other machine-readable information (e.g., barcodes, text, etc.) on physical objects and moving such objects to particular locations with limited-to-no human interaction may be desirable. In one such scenario, a robot may grab, manipulate, and move packages (e.g., boxes). For instance, a robot may load/unload packages into/from a truck, load/unload packages onto/from a pallet, or otherwise manage the packages, such as determining locations for the packages to be placed in storage or during processing. A system configured to implement these scanning methods may not assume human feedback to verify the correct code or text orientation of machine-readable information, nor may it assume nicely aligned packages on a conveyor belt or part of some other apparatus that may be used to quickly and efficiently scan the packages (e.g., a "scanning station"). Instead, the system may use 2D or 3D sensors to identify the orientation and scale to search surfaces for machine-readable codes or text in a given environment that the sensors are viewing.

An example system may comprise a robotic device, such as a robotic arm, and one or more optical sensors, such as 2D or 3D sensors. The robotic arm may be configured to move a physical object through a designated area in space of a physical environment of the system. The one or more optical sensors may be configured to determine a location of a machine-readable code on the physical object as the physical object is moved through the designated area in space and, based on the determined location of the machine-readable code, scan the machine-readable code as the physical object is moved through the designated area in space so as to determine information associated with the physical object encoded in the machine-readable code. Then, based on information associated with the physical object encoded in the machine-readable code, the system may determine a respective location in the physical environment at which to place the physical object.

In some embodiments, the information/data encoded in the machine-readable code and associated with the physical object may include the object's size, the object's weight, an identifier as to whether the physical object is to be loaded, unloaded, or put aside, and/or an identifier of a specific location in the physical environment at which to load, unload, or otherwise move the physical object. Other information associated with the objects or the robotic device may be encoded in the machine-readable code as well. Such information may enable a robotic device/system to scan the physical object and move it to its desired location in a quick, efficient manner.

Various configurations of this type of system are possible, and such configurations may be used alone or in combination with each other. In one example configuration, a robotic arm may carry a reader (e.g., an array of sensors/cameras/sensors). For instance, the reader may comprise a single camera that is scanned over the box's surfaces. The reader may alternatively comprise multiple cameras oriented at various positions such that when the reader is moved over the box, the reader can view multiple surfaces of the box at various angles. Alternatively, the reader may comprise a single camera and four mirrors so that a wide angle lens with a high resolution mono or depth camera can view and scan five surfaces of the box. Further, this example configuration may include a camera located underneath a platform on which the box is either placed or moved over during scanning. The platform may be transparent or semi-transparent so that the camera located underneath it can scan the bottom surface of the box. Other camera arrangements are possible as well.

In another example configuration, the robotic arm may bring a box through a reading station after or while orienting the box in a certain manner, such as in a manner in order to place the machine-readable code in a position in space where it can be easily viewed and scanned by a camera.

In yet another example configuration, multiple cameras may be positioned surrounding a designated space such that the robotic arm carrying a physical object will not collide with the cameras. And, in such a configuration, the cameras may be configured to all focus on a "sweet spot" for machine-readable code reading in space where barcodes, text, etc. would be sharply in focus when the robotic arm swings the physical objects through the designated space. The system's knowledge of where the robotic arm is and capability to time the cameras may ensure that high-quality pictures of the physical object are captured, so as to facilitate quick and accurate scanning. Further, the use of depth cameras in such a configuration may help ensure that the system accounts for surface orientations.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap-around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
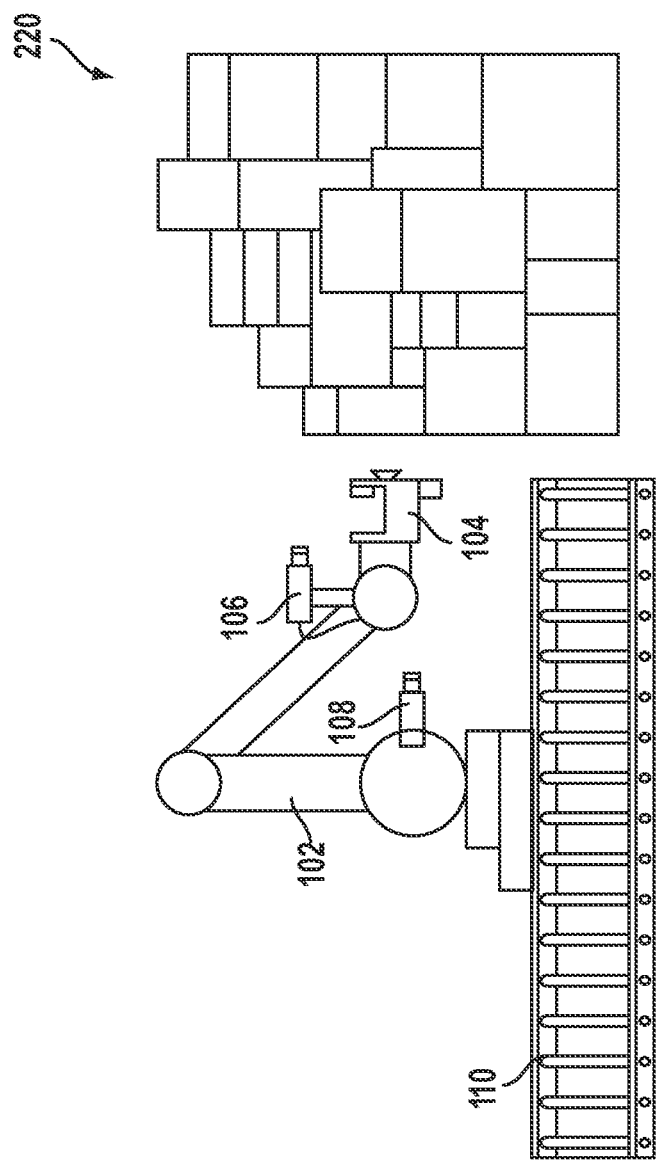
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
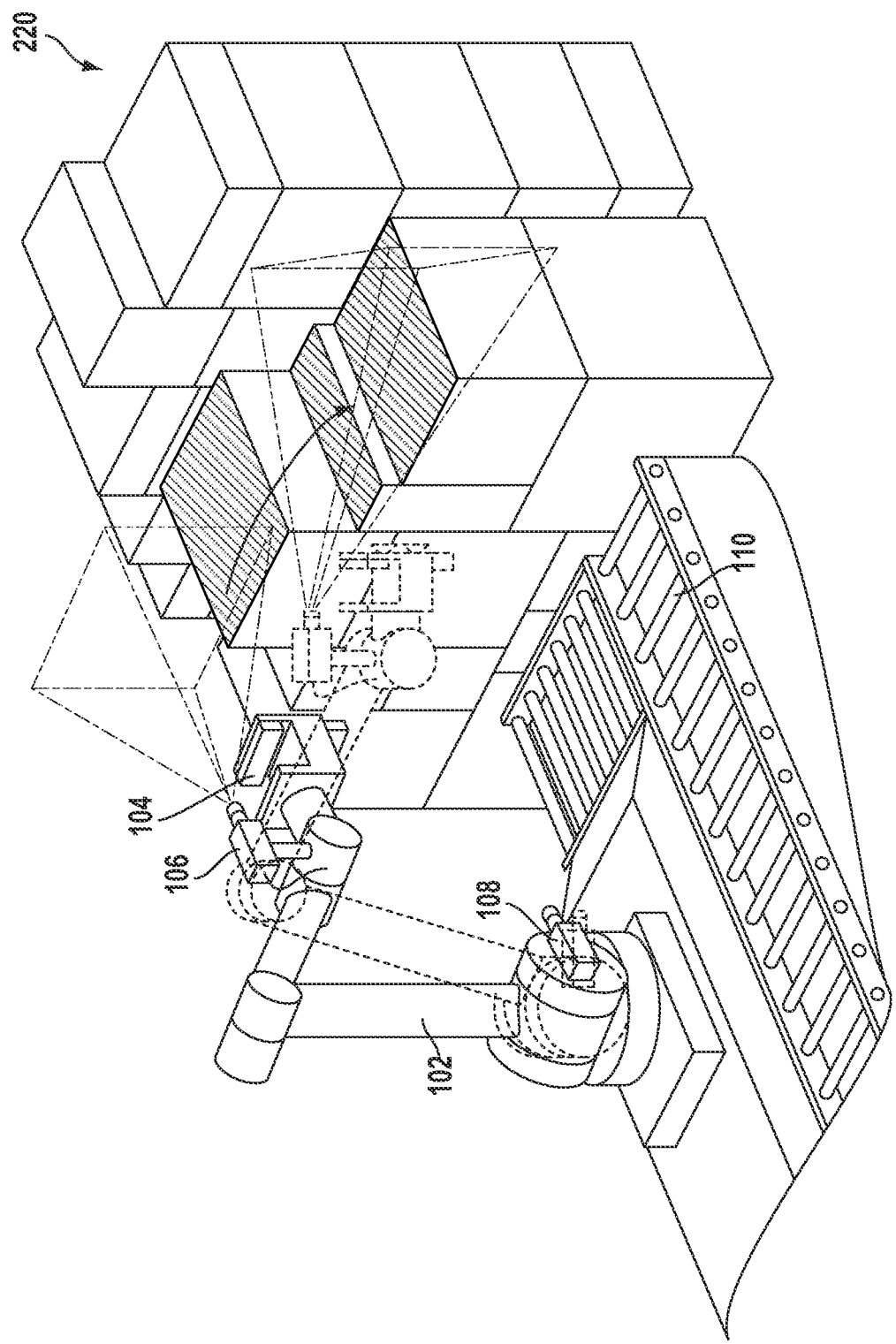
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
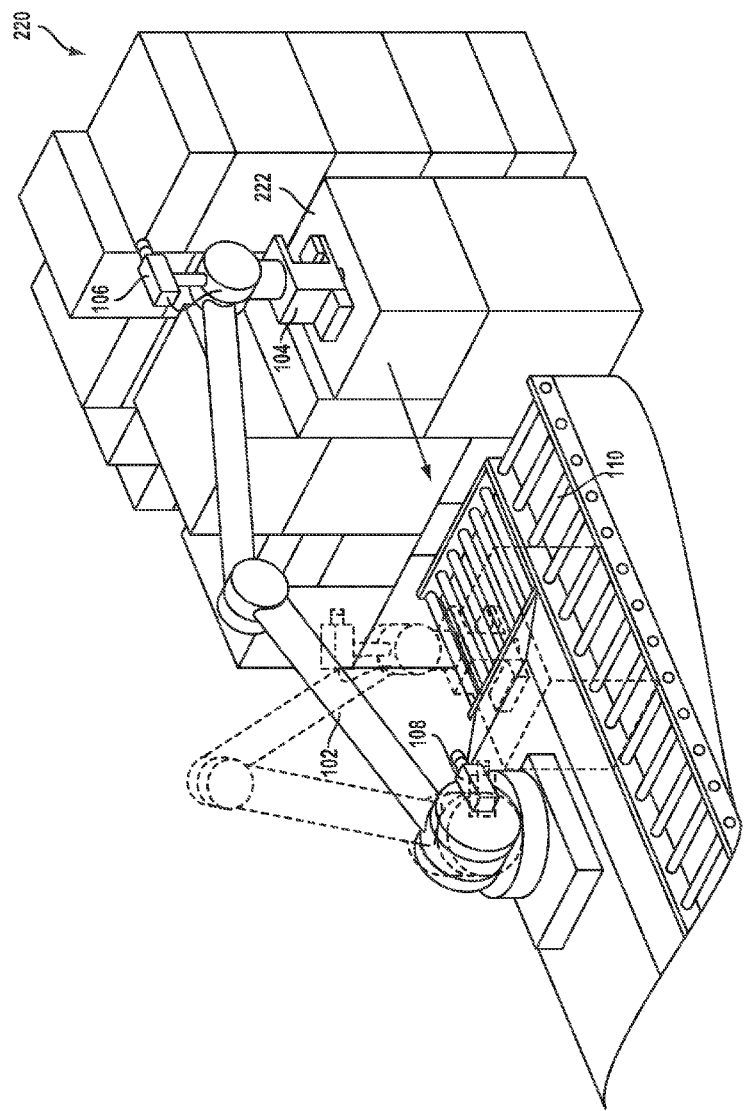
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200, etc.) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
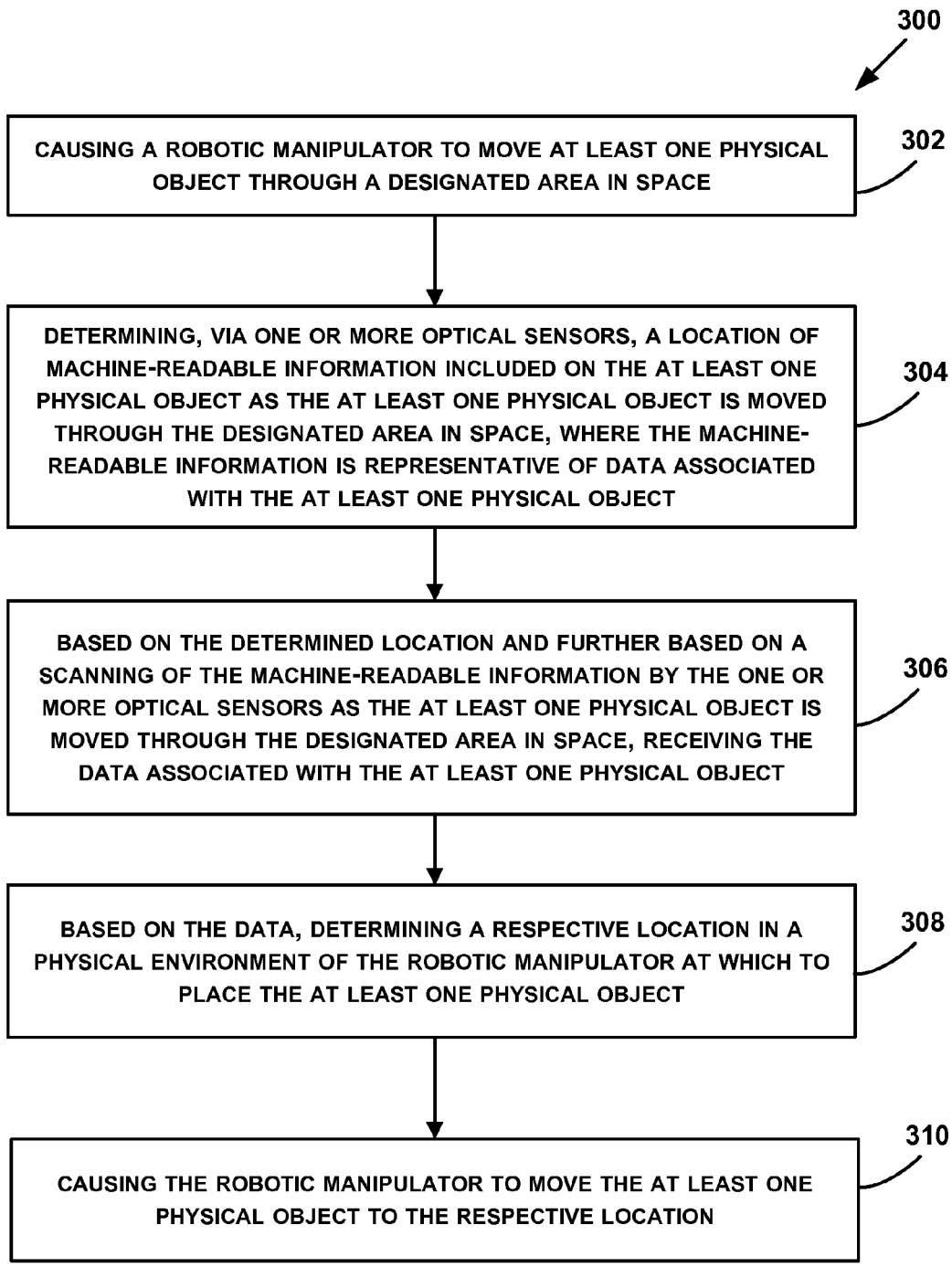
FIG. 3 is a flow chart of an example method, in accordance with at least some embodiments described herein.

FIG. 3 is a flow chart of an example method for recognizing machine-readable code on a 3D object, in accordance with at least some embodiments described herein. Method 300 shown in FIG. 3 presents an embodiment of a method that, for example, could be used with the systems shown in FIGS. 1A-2C, for example, or may be performed by a combination of any components of in FIGS. 1A-2C. In addition, such an embodiment of a method could be used with the systems shown in FIGS. 4A, 4B, 5A, and 5B. Method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Functions of the method 300 may be fully performed by a computing device, or may be distributed across multiple computing devices and/or a server. In some examples, the computing device may receive information from sensors or other components coupled to the computing device, or where the computing device is a server the information can be received from another device that collects the information. The computing device could further communicate with a server to determine a match or partial match of a barcode or text string, for example, where the server may include a database of barcodes, text strings, and/or other information that may facilitate the performance of the method 300.

At block 302, the method 300 includes causing a robotic manipulator to move at least one physical object through a designated area in space. The designated area in space may be part of a physical environment of the robotic manipulator. For instance, the physical environment may include one or more of a loading/unloading dock, a package-scanning station, and a conveyor belt, among other possibilities. In some examples, the computing device or devices configured to control the robotic manipulator may be included as part of the robotic manipulator. In other examples, however, the robotic manipulator may be controlled by an external computing device or devices.

At block 304, the method 300 includes determining, via one or more optical sensors, a location of machine-readable information included on the at least one physical object as the at least one physical object is moved through the designated area in space. The machine-readable information may be representative of data associated with the at least one physical object. For instance, the data may be encoded in a barcode, and/or may be directly or indirectly readable by the optical sensors via OCR or another character- or symbol-recognition algorithm. The data may be encoded and readable in other formats as well.

In some examples, the data may generally include an identifier of some type for the at least one physical object, where further information may be available for the at least one physical object in a database that is either local to the physical environment (e.g., in a processing facility) or at a remote location (e.g., a server accessible via the Internet). In more specific examples, the data may include various characteristics, measurements, and/or directives with the at least one physical object. Examples of such data may include: dimensions of the at least one physical object, a weight of the at least one physical object, a respective transport structure on which to place the at least one physical object (e.g., a pallet, conveyor belt, etc.), a respective transport vehicle on which to place the at least one physical object (e.g., a truck), and an identifier of at least one other physical object in the physical environment at which to place the at least one physical object proximate to. Further, the data may include directions for a robotic device or a human to place the object at a certain location or otherwise handle the object in some manner, either immediately following the scanning or at a predetermined period of time after the scanning. Other examples of data are possible as well.

In some scenarios, the system may have prior knowledge of locations of machine-readable codes on respective physical objects and thus may utilizes these locations in order to obtain more accurate scans of the machine-readable codes with minimal error and minimal need for rescanning. In such scenarios, there may be information stored, for instance, in data storage of a computing device controlling the robotic manipulator, and the stored information may be used by a system to determine how to move particular physical objects through the one or more optical sensors. For instance, the stored information may include respective orientation information associated with a given physical object. Such orientation information may include an indication of at least one face or surface of the given physical object that includes the machine-readable code. For example, if the given physical object is a box, a barcode may be bent such that a portion of the barcode is on one face of the box while another portion of the barcode is on a different face of the box. Alternatively, the barcode may be entirely located on one face of the box. As another example, if the given physical object is spherical or rounded, the orientation information may include other identifying features of the given physical object that can enable the system to determine an appropriate trajectory to move the given physical object to facilitate scanning of a barcode on a surface of the given physical object. Other examples are possible as well.

Based on the orientation information, causing the robotic manipulator to move the given physical object through the designated area in space may involve causing the robotic manipulator to grasp the given physical object at one or more locations different from the at least one face or other surface including at least a portion of the machine-readable code. In other words, the robotic manipulator may grab the given physical object in such a way that it does not cover any portion of the machine-readable code or block the machine-readable code from view of the one or more optical sensors. One or more algorithms not described herein may be implemented in order to further determine ideal gripping points on the given physical object.

Further, causing the robotic manipulator to move the given physical object through the designated area in space may also involve causing the robotic manipulator to move the given physical object through the designated area in space such that the at least one face of the given physical object moves within a particular field of view of the one or more optical sensors. For instance, based on the orientation information and a manner in which the robotic manipulator grasped the given physical object, the robotic manipulator may then move the physical object through the designated area in space so as to best expose the machine-readable code to one or more of the optical sensors.

In some embodiments, the one or more optical sensors may include at least one depth sensors configured to obtain a 3D virtual model of the physical objects to be scanned. The one or more optical sensors may use a full or partial 3D capture of at least one surface of a physical object in order to identify whether one or more portions of a machine-readable code are included on the at least one surface. Accordingly, as a given physical object is moved through the designated area in space, a computing device may receive sensor data from multiple depth sensors, where the sensor data is representative of a 3D virtual model of the given physical object. The computing device may then identify a machine-readable code from the 3D virtual model and/or from other images taken of the give physical object by the depth sensors or other sensors. For instance, the computing device may be better enabled to rectify a distorted or otherwise incomplete image of the machine-readable code when the computing device can determine how far away each point of the machine-readable code is via a depth camera.

In some embodiments, the computing device may determine dimensions of the given physical object or other characteristics of the given physical object from the sensor data. The dimensions or other characteristics may be used by the computing device in order to determine where to move the given physical object to. For example, if the given physical object is small enough to fit between two other physical objects that have already been scanned and had their dimensions determined, the computing device may cause the robotic device to place the given physical object between the two other physical objects. Other examples are also possible.

At block 306, the method 300 includes, based on the determined location and further based on a scanning of the machine-readable information by the one or more optical sensors as the at least one physical object is moved through the designated area in space, receiving the data associated with the at least one physical object.

In some embodiments, the computing device may direct the one or more optical sensors to scan the machine-readable information based on the determined location. The scanning may comprise, for instance, the one or more optical sensors capturing one or more images of the machine-readable information. Then, as a result of the scanning, the computing device may receive, from the one or more optical sensors for instance, scanning information associated with the at least one physical object. In some examples, the computing device may receive the data associated with the at least one physical object directly (i.e., the scanning information may take the form of the data). In other examples, the computing device may first receive scanning information, such as the one or more captured images of the machine-readable information, and then the computing device may determine the data from that scanning information (e.g., from the one or more captured images). Other examples are also possible.

As one example, if the machine-readable information is a barcode, the one or more optical sensors may focus on the located barcode and scan the barcode to read the data encoded in the barcode. As another example, if the machine-readable information includes at least one text string, the scanning may involve capturing one or more images of the machine-readable information and implementing one or more algorithms to recognize the at least one text string and/or any other data represented by the machine-readable information, such as OCR. The computing device can then determine the data associated with the given physical object that includes the machine-readable information (if the computing device has not already received such data).

In some examples, the one or more optical sensors may include multiple optical sensors coupled to respective locations surrounding the designated area, such as couple to a platform including the designated area or coupled to other robotic manipulators or mechanisms. Further, the multiple optical sensors may include telephoto lenses, or other equipment enabling the sensors to have a wider angle of view. In such examples, the computing device may determine a focus point in space in the designated area at which to focus the scanning performed by the multiple optical scanners. Then, the computing device may cause the robotic manipulator to orient the at least one physical object while moving the at least one physical object through the designated area in space such that the machine-readable information is scanned at the determined focus point. In some scenarios, the focus "point" may correspond to an area in space rather than just a single point in space. In this focus area, the machine-readable information may be viewed and scanned in high-resolution in order to facilitate more efficient scanning.

In some examples, the computing device may be configured to substantially synchronize the timing of the robotic manipulator moving through the designated area with the timing of the scanning. For instance, in one such example, the computing device may determine a trajectory and a speed at which to move the at least one physical object through the designated area in space. As such, the computing device may cause the robotic manipulator to move the at least one physical object through the designated area in space at the determined trajectory and at the determined speed. The computing device may determine respective timing information for each of the one or more optical sensors. For instance, one optical sensor may perform its scanning before another optical sensor performs its respective scanning. To facilitate this, the computing device may determine respective scan times for the one or more optical sensors, based on the determined trajectory, the determined speed, and/or other factors not described herein. As such, the computing device may cause the one or more optical sensors to scan the machine-readable information at the determined respective scan times as the at least one physical object is moved through the designated area in space at the determined trajectory and at the determined speed. Other examples of timing the movement of the robotic manipulator with the timing of the one or more optical sensors are possible as well.

In some examples, the scanning of the at least one physical object may be performed incorrectly, or may result in an incomplete scanning, perhaps due to machine-readable information that is difficult to read. In such examples, the computing device may receive data indicative of an incomplete scanning of the at least one physical object. Then, based on the data indicative of the incomplete scanning and further based on the determined location of the machine-readable information, the computing device may cause the robotic manipulator to move the at least one physical object through the designated area again, perhaps at a different trajectory, a different speed, etc. And, as the robotic manipulator moves the at least one physical object through the designated area, the computing device may cause the one or more optical sensors to rescan the machine-readable information so as to determine the data associated with the at least one physical object in a complete manner.

In some scenarios, the one or more optical sensors may not capture a fully-readable image of the machine-readable information, and thus, the scanning may require additional steps to facilitate a complete and accurate scanning of the machine-readable information. For example, the computing device may determine, via the one or more optical sensors, at least one image corresponding to at least a portion of the machine-readable information. Based on the particular view of the machine-readable information in the at least one image, the computing device may modify a scan and/or an orientation of the at least one image. The computing device may then perform various functions. One such function may involve the computing device processing the modified at least one image so as to obtain better resolution for the modified at least one image to facilitate scanning.

Another such function may involve the computing device comparing the modified at least one image with a predetermined machine-readable information template, such as one or more known (e.g., previously-scanned or similar) barcodes, text strings, etc. For instance, the computing device may look at particular coordinates of the modified at least one image and identify known features of the modified at least one image that substantially match known images.

Then, based on outputs of one or more of the functions noted above, such as a result of the comparison, the computing device may determine a remaining portion of the machine-readable information or may otherwise rectify the modified at least one image so as to enable the one or more optical sensors to scan the machine-readable information.

In some examples, it may be possible to make barcode or other markings on the at least one physical object more readable by "rectifying" them from their image projection into a normalized view (i.e., where they are oriented along vertical and horizontal axes—rather than being rotated), and where they are planar and viewed along the normal of the plane. The computing device may perform this rectification from the image plane to a normalized view by finding fiduciary markings on the image of the barcode. On a 2D barcode, for instance, there may be special locator features to scan for. Whereas, for a 1D barcode, the computing device may look for a patch of high, unidirectional gradients. When a barcode is found, the computing device may use the features in it (e.g., corners boundaries for 1D, feature markers or boundary marks for 2D) to determine a homography (e.g., a mapping of the plane of the feature to the plane of the imager). The homography may be used to calculate a rectification from the image view of the barcode to a new view, which removes the perspective distortion of the barcode and scales the barcode to a normalized size. This rectified view may be a normalized view in which the information in the barcode appears in a consistent place or pattern, thereby removing the need to perform complex search to find the information.

In addition to using visual features on a barcode, the computing device may also use depth information from a depth sensor to find 3D points in the vicinity of the barcode, and from these points, estimate the plane on which the barcode resides. By knowing this plane and the outlines of the barcode, the computing device may then construct a homography to rectify the barcode image to a normalized view.

In some cases, it may be more robust for the computing device to use pattern matching to find the information in a barcode. For example, to read the code for the numeral "1" in the pattern, the computing device may perform a pattern match of that bar pattern within the found barcode. Pattern matching may be much more efficient when the image object to be matched is presented in a normalized fashion, and correctly oriented and scaled.

At block 308, the method 300 includes, based on the data, determining a respective location in a physical environment of the robotic manipulator at which to place the at least one physical object. In some examples, the respective location may be determined based on other factors as well, additionally or alternatively to the data associated with the at least one physical object, such as determined dimensions of the at least one physical object, as noted above.

In some scenarios, the respective location may not be in the physical environment of the robotic manipulator in the sense that the respective location may not be within reach of the robotic manipulator or relatively proximate to the robotic manipulator. For instance, based on information encoded in a given physical object's machine-readable code, the computing device may determine that the physical object must be placed at a given location immediately following the scanning of the object, but may determine another location (or locations) where the object should be placed at some time in the future after the scanning.

At block 310, the method 300 includes causing the robotic manipulator to move the at least one physical object to the respective location. This function may involve the robotic manipulator releasing or otherwise decoupling the at least one physical object from the robotic manipulator such that the at least one physical object is placed at the respective location. The respective location may be, for instance, at a location proximate to a box, at a location on a conveyor belt, or at a location where a given physical object can be decoupled from the robotic manipulator and subsequently coupled to another robotic manipulator, among other possibilities.

In some scenarios, however, devices other than the robotic manipulator may move the physical object to the respective location. For instance, upon scanning the physical object, the computing device may determine that the physical object may eventually need to be placed somewhere or handled in some specific way by a device that is not within the physical environment of the robotic manipulator. The information encoded in the machine-readable information may facilitate this future placement or general handling of the physical object.

Moreover, in scenarios where the physical object is to be placed at a location at a point in time that is not immediately following the scanning of the object, the method 300 may further involve causing the robotic manipulator to place the at least one physical object at the respective location after a predetermined period of time from the determining of the information associated with the at least one physical object encoded in the machine-readable code. And, in some examples, the computing device may even determine the period of time after which to eventually cause the robotic manipulator (or other device) to interact with the object. Other examples are also possible.

Figure 4A:
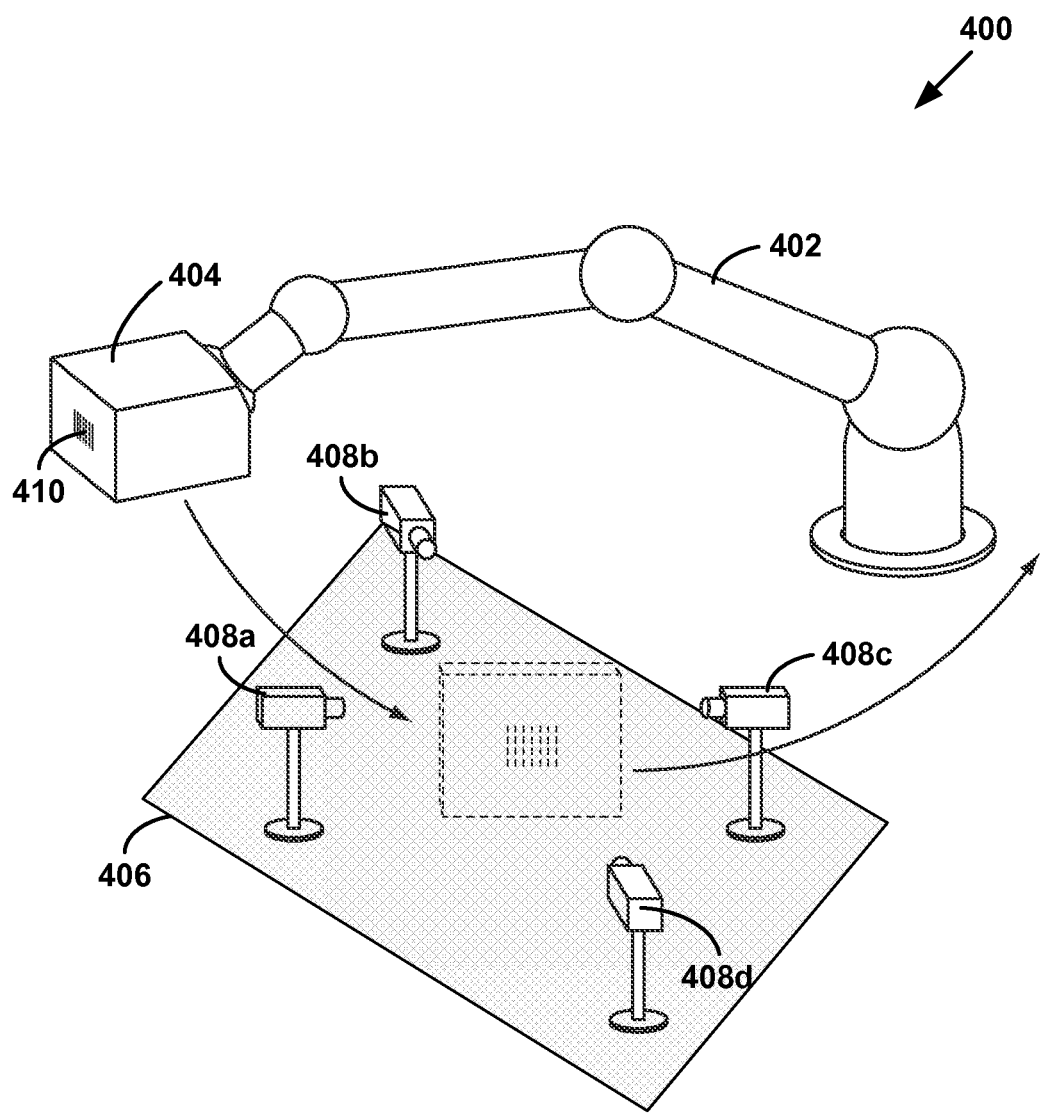
FIG. 4A illustrates an example system configured to perform functions of the example method, in accordance with at least some embodiments described herein.

FIG. 4A illustrates an example system 400 configured to perform functions of the example method, in accordance with at least some embodiments described herein. As shown, a robotic arm 402, controlled by a computing device (not shown), may bring a box 404 through a reading station 406. The reading station 406 may include four cameras 408a-d surrounding the "designated area," though in other embodiments the reading station 406 may include more or less cameras and/or may include other types of sensors. For instance, one or more cameras may be located beneath the reading station 406, such as beneath a glass or other transparent surface such that the bottom of the box 404 as the robotic arm 402 brings the box 404 through the reading station 406. The four cameras 408a-d may include one or more mono cameras and/or one or more depth cameras.

As noted above, the robotic arm 402 may be configured to grip, orient, and/or otherwise manipulate the box 404 such that a barcode 410 (or text, or other type of machine-readable information) on the box is visible by at least one of the four cameras 408a-d as the robotic arm 402 rotates, swings, or otherwise moves the box 404 through the reading station 406. For instance, based on a size of the box 404, the computing device may determine a trajectory at which to move the box 404 such that neither the box 404 nor the robotic arm 402 comes into direct contact with, or come within a threshold distance from, the cameras 408a-d.

The four cameras 408a-d may be located within the reading station 406 or surrounding the reading station 406, each camera at a given distance from the designated area. As such, the designated area may include the entire area within the reading station 406, or may include a smaller area within the reading station 406 where the robotic arm 402 can move the box 404 through without coming into contact with any of the four cameras 408a-d.

In some embodiments, the four cameras 408a-d (or, in general, the one or more optical sensors) may be movable by one or more robotic devices proximate to the designated area and controlled by a computing device, such as one or more robotic arms, conveyors, and/or other mechanisms coupled to and controlled by the computing device. In such embodiments, a computing device may dynamically adjust the locations of the four cameras 408a-d with respect to the designated area (e.g., move closer to or further away from the designated area) and reading station 406 based on a size of a given physical object that is about to enter the designated area (e.g., so as to avoid contact with the given object), based on the location of the robotic arm 402, and/or based on other information.

In some embodiments, the cameras 408a-d may be timed and synchronized with the robotic arm 402 so that high-quality images of the box 404 can be captured by the cameras 408a-d and the barcode 410 can be identified and scanned from those images. After the box 404 has been moved through the reading station 406, the computing device may determine whether the cameras 408*a-d* were able to capture sufficient enough images of the box 404 for scanning the barcode 410. If the barcode 410 was successfully scanned, the computing device may direct the robotic arm 402 to place the box 404 at a respective location (not shown). On the other hand, if the barcode 410 not successfully scanned, the computing device may direct the robotic arm 402 to rescan the box 404.

Although not shown in FIG. 4A, the example system 400 may include a conveyor belt or other mechanism used to move the box 404 through the reading station 406 alternatively to or additionally to the robotic arm 402.

Figure 4B:
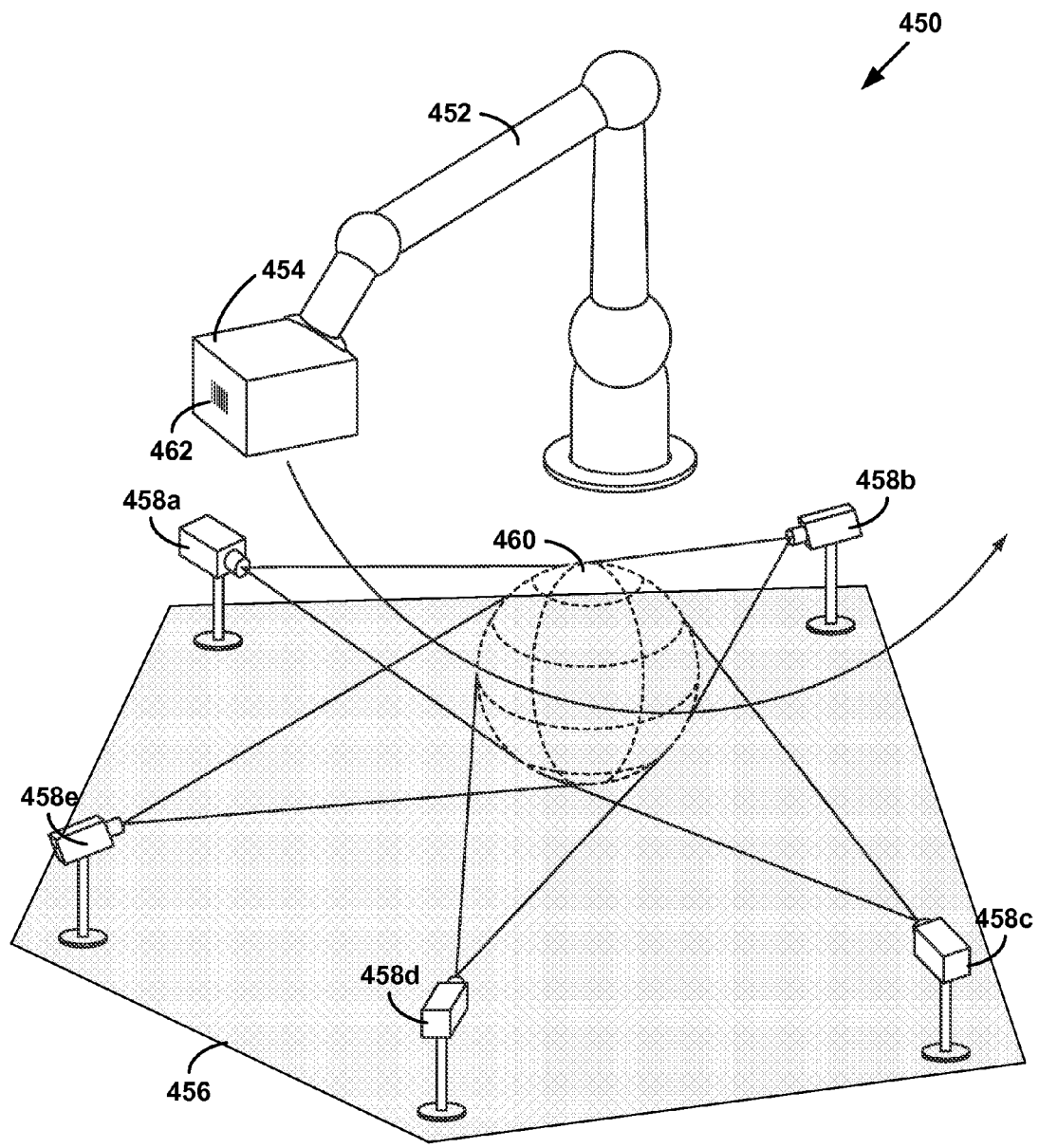
FIG. 4B illustrates a variation of the example system of FIG. 4A configured to perform functions of the example method, in accordance with at least some embodiments described herein.

FIG. 4B illustrates a variation of the example system 450 configured to perform functions of the example method, in accordance with at least some embodiments described herein. As shown, a robotic arm 452, controlled by a computing device (not shown), may bring a box 454 through a reading station 456. The reading station 456 may be include five telephoto cameras 458*a-e* (i.e., cameras with telephoto lenses) surrounding the "designated area," though in other embodiments the cameras may take other forms or the reading station 456 may include more or less cameras than those shown.

The cameras 458*a-e* may be located at respective threshold distances from the designated area such that there is little to no risk of the robotic arm 452 or the box 454 coming into contact with the cameras 458*a-e*. In the example system 450 shown in FIG. 4B, the cameras 458*a-e* may be located further from the designated area than the example system 400 of FIG. 4A.

As arranged, the cameras 458*a-e* may provide a large depth of field such that objects within view of the cameras 458*a-e* may stay in focus over a large range of depth. All of the cameras 458*a-e* may all be focused around a "sweet spot" (i.e., a point/area of best focus) 460 in space where the box's barcode 462 (or text, or other type of machine-readable information) will be sharply in focus while the robotic arm 452 moves the box 454 through the reading station 456. The sweet spot 460 may generally be determined a priori, and the computing device may use the sweet spot 460, along with 3D data associated with the box 454 (e.g., a 3D model) determined by the cameras 458*a-e*, to move the box 454 such that the relevant surfaces pass through the sweet spot 460.

As noted above, the computing device may plan a trajectory for moving the box 454 through the reading station 456 and time the cameras 458*a-e* such that the robotic arm 452 and the cameras 458*a-e* are synchronized. The computing device may, for instance, cause the robotic arm 452 to orient the box 454 while moving the box 454 through the designated area in space such that the barcode 462 is scanned by the cameras 458*a-e* at the determined sweet spot 460 at which all the cameras 458*a-e* are focused.

Figure 5A:
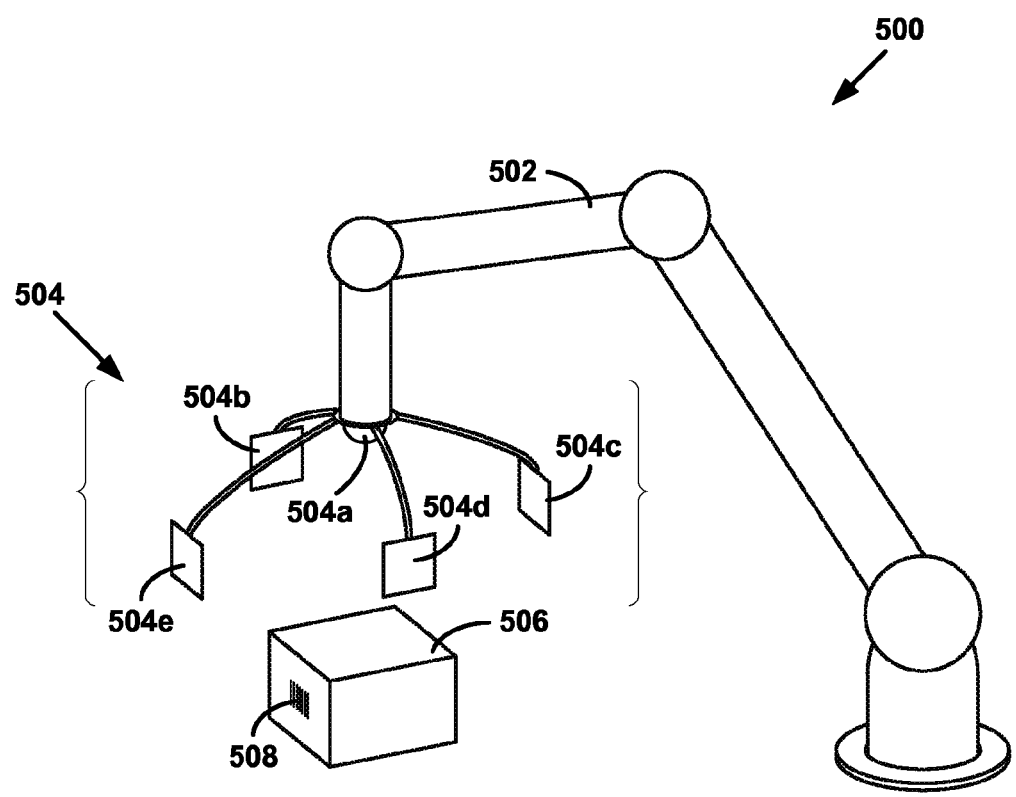
FIG. 5A illustrates another example system configured to perform functions of the other example method, in accordance with at least some embodiments described herein.
Figure 5B:
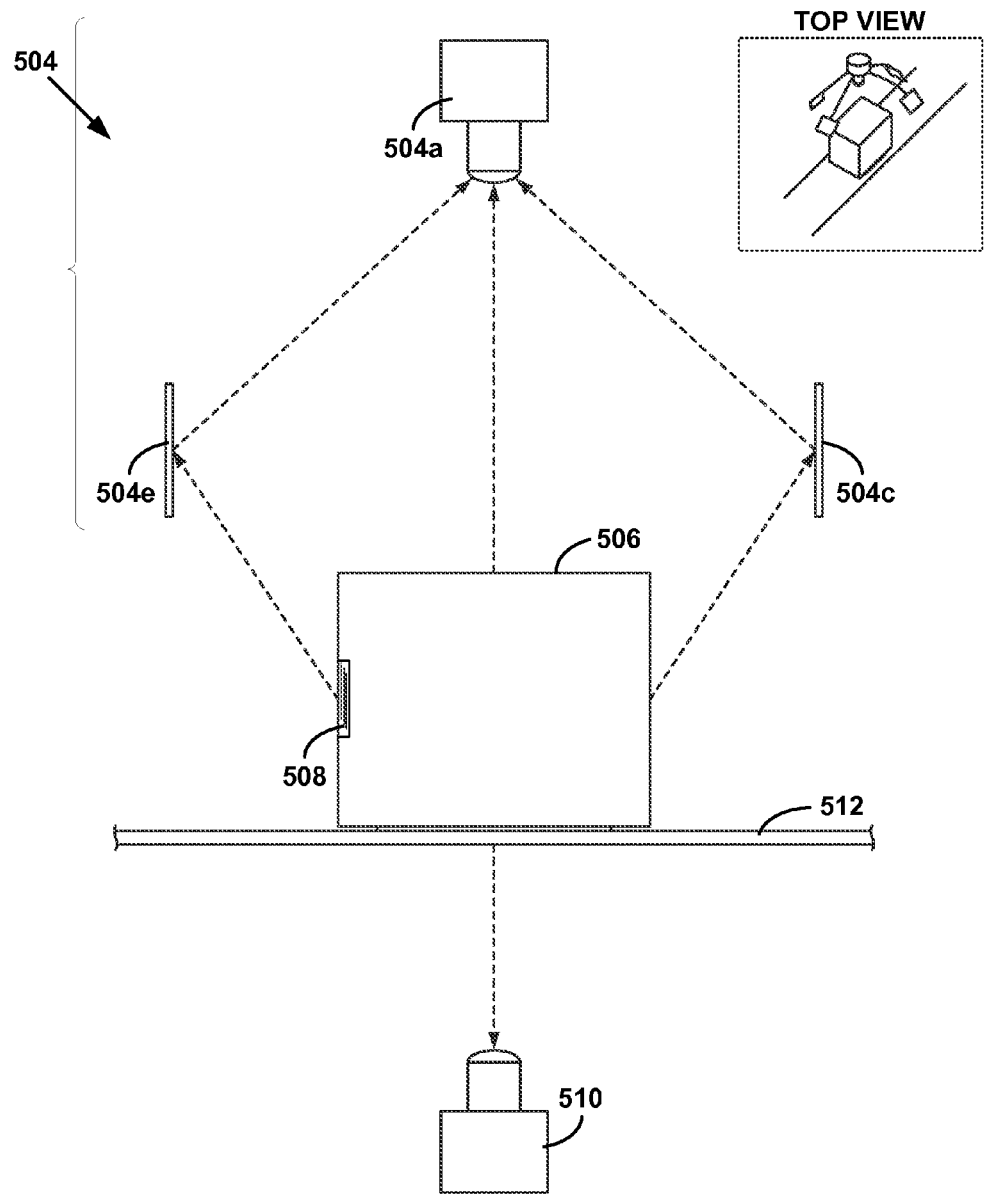
FIG. 5B illustrates an alternate view of the other example system of FIG. 5A configured to perform functions of the other example method, in accordance with at least some embodiments described herein.

In other types of systems, the robotic manipulator may be configured to function as (or include) a reader. The reader may, for example, comprise one or more optical sensors and may be coupled to the robotic manipulator. In order for such a system to accurately and efficiently scan machine-readable information on a physical object, the computing device may first determining respective locations in a designated area of a physical environment of the system at which to place one or more optical sensors such that the one or more sensors are proximate to the physical object in the designated area. The computing device may then cause at least one robotic manipulator to move to a particular location such that the one or more optical sensors are located at the determined respective locations. For instance, based on the size and shape of the physical object and/or based on other elements in the physical environment (e.g., other objects which the robotic manipulator or sensors may potentially collide with), the placement of the robotic manipulator and/or the respective one or more optical sensors may be moved to locations that facilitate views of a majority of the physical object's surfaces by the one or more optical sensors. FIGS. 5A and 5B illustrate one such system configured to implement these functions, as well as other functions noted above with respect to the method 300.

FIG. 5A illustrates another example system 500 configured to perform functions of the example method, in accordance with at least some embodiments described herein. This system 500 may include a robotic arm 502 that carries a reader 504 configured to scan a box 506. In some examples, the reader 504 may include a single camera that is used to scan the box 506. For instance, the robotic arm 502 may move around a box 506, capturing various images of the box 506 using the reader 504.

In other examples, however, such as the example shown in FIG. 5A, the reader 504 may include one camera 504*a* and four mirrors 504*b-e*. And in still other examples not shown herein, the reader 504 could include other combinations of cameras and mirrors, such as a five-camera arrangement where, instead of mirrors, the reader 504 includes four cameras where each camera is aimed at a respective surface of a box 506 (or other physical object). Other example arrangements of the reader 504 are possible as well.

In the example shown, the camera 504*a* of the reader 504 may be a high-resolution mono or depth camera with a wide angle lens configured to read five surfaces of the box 506 at once using reflections of each surface in the four mirrors 504*b-e*. In some scenarios, the computing device may determine the location of the barcode 508 and may scan the barcode 508 via the camera 504*a* and one or more mirrors 504*b-e*.

FIG. 5B illustrates an alternate view of the example system in FIG. 5A configured to perform functions of the example method, in accordance with at least some embodiments described herein. In particular, FIG. 5B illustrates the camera 504*a* of the reader 504 detecting and scanning the barcode 508 using the reflection of the barcode 508 off of one of the mirrors 504*e*. However, in some scenarios, a barcode may be located on the bottom of the box 506, and thus the example system 500 may include another camera 510 underneath a platform 512 in the designated area. The platform 512 (e.g., a glass platform, conveyor belt, etc.) may be configured to support the box 506 while the box 506 is scanned by one or more optical sensors, including the other camera 510, which may be configured to determine a location of the barcode on the bottom of the box 506 and scan the bottom of the box 506 when the box 506 is in the designated area. Thus, all six sides of the box 506 can be scanned substantially simultaneously via the camera 504*a* coupled to the reader 504, the mirrors 504*b-e*, and the additional camera 510 underneath the platform 512. It should be understood that in other example systems, cameras, mirrors, and other sensors may be arranged and manipulated so as to scan all sides of physical objects shaped differently than a six-sided box.

In embodiments such as those illustrated in FIGS. 5A and 5B, the image(s) of the machine-readable information captured from a reflection in a mirror may be distorted. As such, the system 500 may implement one or more functions to rectify the image(s) for scanning, such as those functions noted above. Generally, the computing device may approximately pre-compute how a given machine-readable code would look from an angle of a mirror and compensate for the distorted image of the given machine-readable code by either unwarping the distorted image (e.g., modifying a scale, orientation, etc. of the image) and performing template matching, or warping a predetermined template and applying the warped predetermined template to the image.

For instance, the computing device may modify a scale and/or an orientation of at least one image of the machine-readable information, where the at least one image corresponds to at least a portion of the machine-readable information based on a reflection of the machine-readable code in the one or more mirrors. The computing device may then make a comparison between the modified at least one image and a predetermined machine-readable information template. Then, based on the comparison, the computing device may determine a remaining portion of the machine-readable information so as to enable the one or more optical sensors to scan the machine-readable information. Other functions for rectifying images may be implemented as well, additionally or alternatively to the function just described.

In other embodiments not illustrated herein, the system 500 may include multiple robotic manipulators additionally or alternatively to the robotic arm 502. Such robotic manipulators may be used to move other cameras, mirrors, or scanning devices around physical objects in an environment of the system 500, when the physical objects are moving through the environment of the system (e.g., on a conveyor or other moving platform) and/or when the physical objects are not moving.

It should be understood that, in some embodiments, a system configured to implement the methods described herein may include combinations of elements from the example systems shown in FIGS. 4A-B and FIGS. 5A-B. For example, a robotic arm may include a reader comprising one or more optical sensors, and the robotic arm may be configured grab an object, scan an object, and/or move the box through another, external reader comprising one or more additional optical sensors. Other examples are possible as well.

Figure 6:
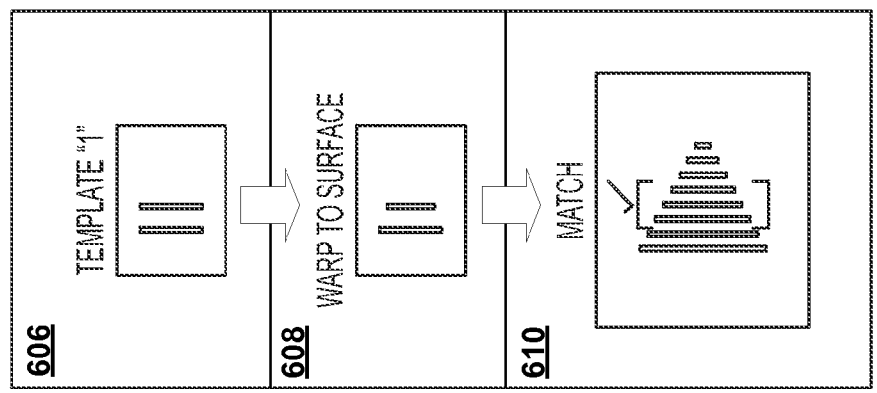
FIG. 6 illustrates some aspects of the example methods, in accordance with at least some embodiments described herein.
Figure 6:
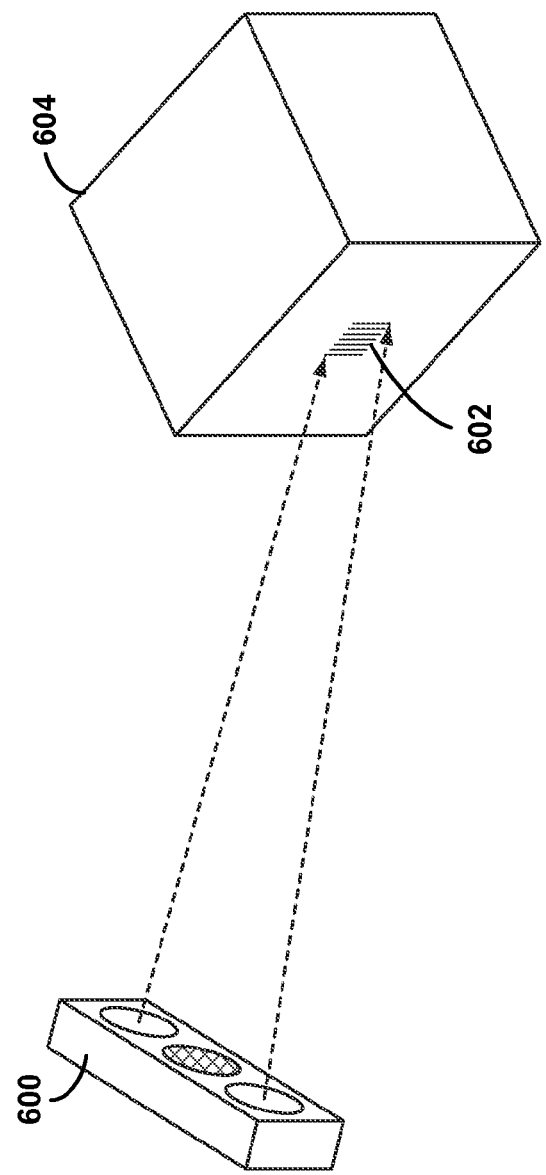

FIG. 6 illustrates some aspects of the example methods, in accordance with at least some embodiments described herein. As shown, a stereo camera arrangement 600 may be configured to determine a location of a barcode 602 on a box 604 in a designated area, rectify the barcode 602 so that it can be scanned, and then scan the barcode 602. It should be understood that other camera arrangements are possible as well.

In some embodiments, a computing device may implement a barcode algorithm which may comprise one or more operations, some of which are described below.

First, the computing device may detect where the barcode 602 is on the box 604. For instance, if the barcode 602 is a 1D barcode, the stereo cameras 600 may look for groups of high, unidirectional gradients, or other features, as noted above. On the other hand, if the barcode 602 is a 2D barcode, there may be locator features, such as uniquely-identifiable patterns, that can be located.

Then, when the barcode 602 is found, the barcode's features (e.g., corners boundaries for 1D, feature markers or boundary marks for 2D) may be used to determine a homography (e.g., a mapping of the plane of the feature(s) to the plane of the imager). The homography may be used to remove the perspective distortion of a given barcode feature so that it can be read easier (e.g., "warp" the barcode).

In some embodiments, instead of trying to read zero crossings for 1D barcodes, the computing device may implement pattern recognition to look for features that match that of the bar pattern captured in an image by the stereo camera arrangement 600. That is, to read the code for the numeral "1" in the pattern, the computing device may implement a pattern match of that bar pattern within the found barcode. Steps 606-610 shown in FIG. 6 illustrate an example of such a technique. At step 606, the computing device may have a predetermined template of the numeral "1" in the barcode 602 pattern. Then, at step 608, the computing device may warp the template to fit the orientation of the pattern to match an image of the barcode 602 captured by the camera arrangement 600. Additionally or alternatively, as noted above, the computing device may "unwarp" the image of the barcode 602 and search for an unwarped template of a barcode to compare the unwarped image with. Also, when the computing device uses depth cameras as part of the camera arrangement 600, the barcode 602 barcode may be curved or bent on the surface of the box 604, and the computing device can either rectify (e.g., "flatten") the barcode 602 or warp a template before matching with the warped image of the barcode 602, as shown in step 610.

In some embodiments, the barcode algorithm described above may be improved or other algorithms not described herein may be implemented so that the computing device knows a general size of the barcode or other machine-readable information it is looking for. This would make barcode detection quicker and more robust, as there would be no need to search through scale, minimize perspective distortion, etc.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:
1. A system comprising:
a robotic arm;
a plurality of mirrors coupled to the robotic arm and arranged to provide reflections of respective surfaces of a physical object;
one or more optical sensors coupled to the robotic arm, the one or more optical sensors being configured to detect, on the plurality of mirrors, the reflections of the respective surfaces of the physical object, wherein the plurality of mirrors includes at least four mirrors that are equally spaced out around the robotic arm so as to enable the one or more optical sensors to acquire images of four surfaces of the physical object simultaneously;

at least one processor; and data storage comprising instructions executable by the at least one processor to cause the system to perform functions comprising:

determining a position in a designated area of a physical environment of the system to which to move the robotic arm such that the plurality of mirrors are arranged to provide reflections of multiple respective surfaces of the physical object in the designated area;

causing the robotic arm to move to the determined position;

while the physical object is in the designated area, causing the one or more optical sensors to acquire image data indicative of the reflections on the plurality of mirrors of the multiple respective surfaces of the physical object; and based on the image data, determining a scan of a machine-readable code on the physical object.

2. The system of claim 1, the functions further comprising:

based on the scan, determining data associated with the physical object encoded in the machine-readable code.

3. The system of claim 2, wherein the data associated with the physical object includes one or more of: dimensions of the physical object, a weight of the physical object, a respective transport structure on which to place the physical object, a respective transport vehicle on which to place the physical object, and an identifier of at least one other physical object in the physical environment at which to place the physical object proximate to.

4. The system of claim 2, further comprising at least one robotic manipulator, the functions further comprising:

based on the data associated with the physical object encoded in the machine-readable code, determining a respective location in the physical environment at which to cause the at least one robotic manipulator to place the physical object.

5. The system of claim 4, the functions further comprising:

causing the at least one robotic manipulator to place the physical object at the respective location after a predetermined period of time from the determining of the data associated with the physical object encoded in the machine-readable code.

6. The system of claim 1, wherein the image data includes an image corresponding to at least a portion of the machine-readable code based on a reflection of the machine-readable code in the plurality of mirrors, and wherein determining the scan of the machine-readable code comprises:

modifying a scale and orientation of the image, making a comparison between the modified image and a predetermined machine-readable code template, based on the comparison, determining a remaining portion of the machine-readable code, and responsive to determining the remaining portion of the machine-readable code, and based on the image corresponding to at least the portion of the machine-readable code, determining the scan of the machine-readable code.

7. The system of claim 1, further comprising:

a platform located in the designated area and configured to support an additional physical object, wherein the additional physical object includes an additional machine-readable code located on a bottom surface of the additional physical object; and an additional optical sensor located underneath the platform and configured to scan the bottom surface of the additional physical object as the additional physical object is supported by the platform, wherein the functions further comprise:

while the additional physical object is supported by the platform in the designated area, causing the additional optical sensor to acquire additional image data indicative of the bottom surface of the additional physical object; and based on the additional image data, determining a scan of the additional machine-readable code.

8. The system of claim 1, wherein at least one optical sensor of the one or more optical sensors is coupled to an end of the robotic arm, the system further comprising:

a plurality of connecting members having respective first ends disposed on a periphery of the end of the robotic arm, wherein respective mirrors of the plurality of mirrors are connected to respective second ends of the connecting members, the respective second ends being opposite the respective first ends.

9. The system of claim 1, wherein the data storage includes orientation information associated with the physical object, wherein the orientation information includes an indication of at least one face of the physical object that includes the machine-readable code, and wherein determining the position in the designated area of the physical environment to which to move the robotic arm such that the plurality of mirrors coupled to the robotic arm are arranged to provide the reflections of the multiple respective surfaces of the physical object in the designated area comprises based on the orientation information, determining the position to be a position in the designated area of the physical environment to which to move the robotic arm such that the plurality of mirrors coupled to the robotic arm are arranged to provide the reflections of the at least one face of the physical object.

10. A non-transitory computer readable medium having stored thereon instructions that, upon execution by a computing system, cause the computing system to perform functions comprising:

receiving, from data storage accessible by the computing system, orientation information associated with a physical object, wherein the orientation information includes an indication of at least one face of the physical object that includes a machine-readable information;

based on the orientation information, determining a position in a designated area of a physical environment to which to move a robotic arm such that a plurality of mirrors coupled to the robotic arm are arranged to provide reflections of the at least one face of the physical object in the designated area, wherein one or more optical sensors are coupled to the robotic arm, the one or more optical sensors being configured to detect, on the plurality of mirrors, the reflections of the at least one face of the physical object;

causing the robotic arm to move to the determined position;

while the physical object is in the designated area, causing the one or more optical sensors to acquire image data indicative of the reflections on the plurality of mirrors of the at least one face of the physical object; and based on the image data, determining a scan of the machine-readable information included on the physical object.

11. The non-transitory computer readable medium of claim 10, wherein the machine-readable information included on the physical object includes at least one text string, the functions further comprising:
based on the image data, determining the at least one text string using optical character recognition (OCR), and
determining data associated with the physical object based on the at least one text string.

12. The non-transitory computer readable medium of claim 10, the functions further comprising:
based on the scan, determining data associated with the physical object encoded in the machine-readable information.

13. The non-transitory computer readable medium of claim 12, the functions further comprising:
based on the data associated with the physical object encoded in the machine-readable information, determining a respective location in the physical environment at which to cause at least one robotic manipulator to place the physical object, wherein the at least one robotic manipulator is communicatively linked with the computing system; and
causing the at least one robotic manipulator to place the physical object at the respective location after a predetermined period of time from the determining of the data associated with the physical object encoded in the machine-readable information.

14. The non-transitory computer readable medium of claim 13, wherein the one or more optical sensors include multiple depth sensors, the functions further comprising:
while the physical object is in the designated area, receiving sensor data from the multiple depth sensors, the sensor data being representative of a three-dimensional (3D) virtual model of the physical object; and
based on the sensor data, determining dimensions of the physical object,
wherein determining the respective location in the physical environment at which to cause the at least one robotic manipulator to place the physical object is further based on the determined dimensions of the physical object.

15. The non-transitory computer readable medium of claim 10, wherein the machine-readable information includes one or more of a one-dimensional (1D) barcode and a two-dimensional (2D) barcode.

16. A method performed by a computing system, the method comprising:
controlling a robotic arm and one or more optical sensors coupled to the robotic arm, wherein at least one optical sensor of the one or more optical sensors is coupled to an end of the robotic arm, and wherein respective mirrors of the plurality of mirrors are connected to respective first ends of a plurality of connecting members, the plurality of connecting members having respective second ends disposed on a periphery of the end of the robotic arm;
determining a position in a designated area of a physical environment to which to move the robotic arm such that the plurality of mirrors are arranged to provide reflections of multiple respective surfaces of a physical object in the designated area, wherein the one or more optical sensors are configured to detect, on the plurality of mirrors, the reflections of the multiple respective surfaces of the physical object;
causing the robotic arm to move to the determined position;
while the physical object is in the designated area, causing the one or more optical sensors to acquire image data indicative of the reflections on the plurality of mirrors of the multiple respective surfaces of the physical object; and
based on the image data, determining a scan of a machine-readable information included on the physical object.

17. The method of claim 16, further comprising:
based on the scan, determining data associated with the physical object encoded in the machine-readable information;
based on the data associated with the physical object encoded in the machine-readable information, determining a respective location in the physical environment at which to cause at least one robotic manipulator to place the physical object, wherein the at least one robotic manipulator is communicatively linked with the computing system; and
causing the at least one robotic manipulator to place the physical object at the respective location after a predetermined period of time from the determining of the data associated with the physical object encoded in the machine-readable information.

18. The method of claim 16, further comprising:
receiving, from data storage accessible by the computing system, orientation information associated with the physical object, wherein the orientation information includes an indication of at least one face of the physical object that includes the machine-readable information,
wherein determining the position in the designated area of the physical environment to which to move the robotic arm such that the plurality of mirrors coupled to the robotic arm are arranged to provide the reflections of the multiple respective surfaces of the physical object in the designated area comprises based on the orientation information, determining the position to be a position in the designated area of the physical environment to which to move the robotic arm such that the plurality of mirrors coupled to the robotic arm are arranged to provide the reflections of the at least one face of the physical object.

19. The method of claim 16, wherein causing the one or more optical sensors to acquire image data indicative of the reflections on the plurality of mirrors of the multiple respective surfaces of the physical object comprises causing the one or more optical sensors to capture a plurality of images, each image being indicative of a respective reflection on a respective mirror of at least one of the multiple respective surfaces of the physical object,
wherein the image data comprises the plurality of images, and
wherein determining the scan based on the image data comprises determining the scan based on the plurality of images.

* * * * *